US005268560A

United States Patent [19]

Ueda

[11] Patent Number: 5,268,560

[45] Date of Patent: Dec. 7, 1993

[54] KEY DEVICE

[75] Inventor: Hiroyuki Ueda, Numazu, Japan

[73] Assignee: Tokyo Electric Co., Ltd., Tokyo, Japan

[21] Appl. No.: 882,456

[22] Filed: May 12, 1992

[30] Foreign Application Priority Data

May 22, 1991 [JP] Japan ................................ 3-117696

[51] Int. Cl.[5] ............................................ G06F 15/20

[52] U.S. Cl. .................................... 235/375; 235/492

[58] Field of Search ................. 235/375, 492; 361/171

[56] References Cited

U.S. PATENT DOCUMENTS 2,347,072 10/1967 Ross .
4,788,623 11/1988 Haug .

FOREIGN PATENT DOCUMENTS 0115747 8/1984 European Pat. Off. .
3244566 6/1984 Fed. Rep. of Germany .
0214410 3/1987 Fed. Rep. of Germany .
53-131733 11/1978 Japan .
54-62753 5/1979 Japan .
62-73513 4/1987 Japan .
2079842 1/1982 United Kingdom .

*Primary Examiner*—Harold Pitts
*Attorney, Agent, or Firm*—Frishauf, Holtz, Goodman & Woodward

[57] ABSTRACT

A key device includes a plurality of coils arranged on a printed board having an insertion hole along the longitudinal direction of the insertion hole. One of the plurality of coils is an electromagnetic induction generating coil connected to a power supply, and at least two of the remaining coils are key signal generating coils. In a key main body which can be inserted/removed into/from the insertion hole, a closed circuit is formed on a printed board. In the closed circuit, a plurality of coils and capacitors arranged between the plurality of coils are formed at positions opposite to the plurality of coils arranged along the longitudinal direction of the insertion hole. A bypass is formed in each of the coils arranged in the key main body, and a coil or coils for specifying a key type by switching operations of jumper line switching sections are selected. A key signal or key signals are generated from a key signal generating coil or key signal generating coils opposite to the selected coil or coils.

3 Claims, 3 Drawing Sheets

KEY DEVICE

BACKGROUND OF THE INVENTION

1. Field of the Invention

The present invention relates to electric equipments such as an electronic cash register or to a key device used for a traveling bag.

2. Description of the Related Art

A cashier having a cashier code assigned to an electronic cash register, for example, can be registered in this cash register and can operate it. A keyboard is used as an input means for inputting the cashier code. There are two methods of inputting a cashier code. First, after an input of a cashier code is declared by a declarative key, the code is entered by numerical keys (this method may be reversible), and second, a preset key in which a cashier code is preset is used. In the first method, a cashier code input is cumbersome, and if an erroneous code is input and has already been registered, the input code is valid, and an erroneous operation is performed. On the other hand, although the second method has good operability, since the number of preset keys is limited, the number of cashier codes which can be preset is very small. Therefore, in recent years, an electronic cash register using an electromagnetic key switch as a means for inputting a cashier code has been used.

FIG. 1 is a view showing an arrangement of a main part of a conventional electromagnetic key switch of this type, as is disclosed in Published Unexamined Japanese Patent Application No. 62-73513. In FIG. 1, a key 1 comprises a plate-like key main body 1*a* consisting of a magnetically permeable material and a head portion 1*b* integrally formed at one end of the key main body 1*a*. Reference numeral 2 denotes a key insertion hole in which the key main body 1*a* is inserted. Four Hall elements 3*a*, 3*b*, 3*c*, and 3*d* are linearly arranged along the insertion direction of the key main body 1*a* on a plate member 6 constituting the side portion of the key insertion hole 2.

Magnet buried portions 4*a*, 4*b*, 4*c*, and 4*d* are formed in the key main body 1*a* such that the portions 4*a*, 4*b*, 4*c*, and 4*d* are arranged at positions respectively opposite to the Hall elements 3*a* to 3*d* when the key main body 1*a* is normally inserted into the key insertion hole 2. Magnets 5 are selectively buried in the magnet buried portions 4*a* to 4*d*.

The magnets 5 are buried in the magnet buried portions 4*a* and 4*d* of the magnet buried portions 4*a* to 4*d* but not buried in the magnet buried portions 4*b* and 4*c*. In this case, output signals a and b from the elements 3*a* and 3*d* of the Hall elements 3*a* to 3*d* are turned on by the magnetic forces of the magnets 5, and output signals b and c from the elements 3*b* and 3*c* are kept set in an OFF state.

As shown in FIG. 2, the output signals a, b, and c from the Hall elements 3*a*, 3*b*, and 3*c* are input to input terminal A0, Al, and A2 of a buffer IC 6, respectively, and the output signal d from the Hall element 3*d* is input to a power supply terminal Vcc of the buffer IC 6. Output terminals YO, Y1, and Y2 respectively corresponding to the input terminals A0, Al, and A2 of the buffer IC 6 are connected to a microprocessor I/O port 7 constituting the control main body of the electronic cash register. That is, the output signal d from the Hall element 3*d* serves as a drive power supply of the buffer IC 6, and the output signals a to c from the Hall elements 3*a* to 3*c* are fetched by the buffer IC 6 in response to an ON state of the output signal d from the Hall element 3*d*, such that the output signals a to c are loaded in a microprocessor (not shown) of the electronic cash register through the I/O port 7.

In all keys, the magnets 5 are always buried in the corresponding magnet buried portions 4*d* located at positions opposite to the Hall elements 3*d* in the key main bodies 1*a*, and the magnets 5 are selectively buried in the magnet buried portions 4*a* to 4*c*, thereby setting different types of keys. For this reason, every time when different types of keys are required according to different application purposes, the step of burying magnets in pre-selected buried portions must be performed. Therefore, different types of keys cannot be easily manufactured. In addition, since an electromagnet is used, a low-profile key cannot be easily obtained.

SUMMARY OF THE INVENTION

It is an object of the present invention to provide a key device capable of eliminating the above conventional drawbacks, forming different types of keys in a simple process without burying magnets in a key main body, and obtaining a low-profile key main body.

In order to achieve the above object, according to the present invention, there is provided a key device comprising: a printed board having an insertion hole; key signal generating means including a plurality of coils arranged on the printed board along a longitudinal direction of the insertion hole, the key generating means comprising a power supply, an electromagnetic induction generating coil connected to the power supply, and at least two key signal generating coils; a key main body comprising a printed board which can be inserted/-removed into/from the insertion hole, the key main body comprising a closed circuit including a plurality of coils which are respectively arranged at positions opposite to the plurality of coils of the key signal generating means when the key main body is normally inserted into the insertion hole, and jumper lines for selecting the coils to specify a key type, the jumper lines being connected in series between the plurality of coils through a capacitor such that the jumper lines can be switched to a bypass; and detecting means, connected to the key signal generating coils of the key signal generating means, for detecting a key signal which is generated by a key signal generating coil opposite to the selected coil of the closed circuit when the key main body is normally inserted into the insertion hole.

According to the present invention with the above arrangement, there is provided a key device in which different types of keys can be easily formed by punching coil windings or patterned coils without burying magnets in a key main body and the key main body can be thinned.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

An embodiment of the present invention will be described below with reference to accompanying drawings.

Figure 1:
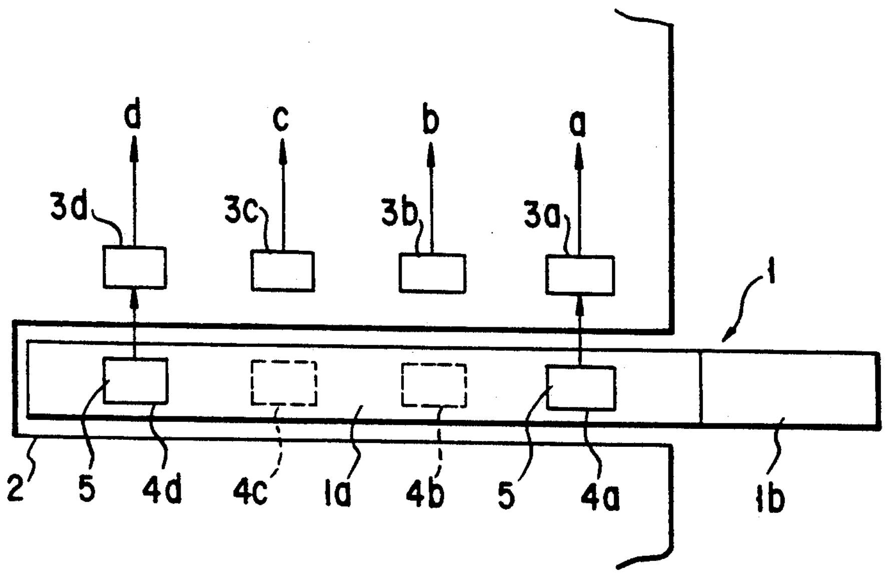
FIG. 1 (PRIOR ART)
FIG. 1 is a view showing an arrangement of a main part of a conventional key device using an electromagnet.
Figure 2:
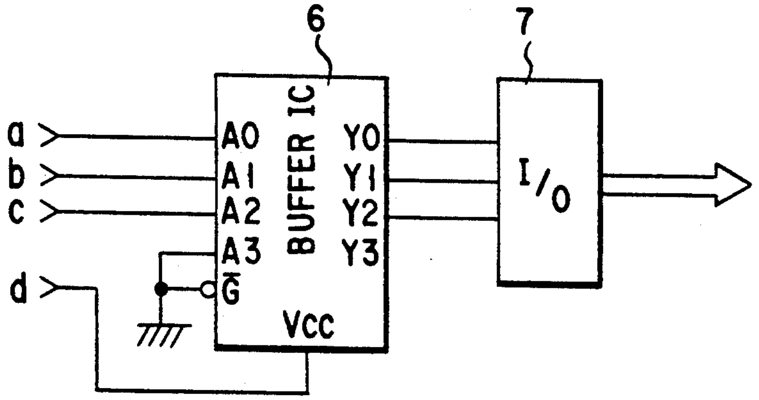
FIG. 2 (PRIOR ART)
FIG. 2 is a circuit diagram showing a conventional processing circuit of a key signal.
Figure 3:
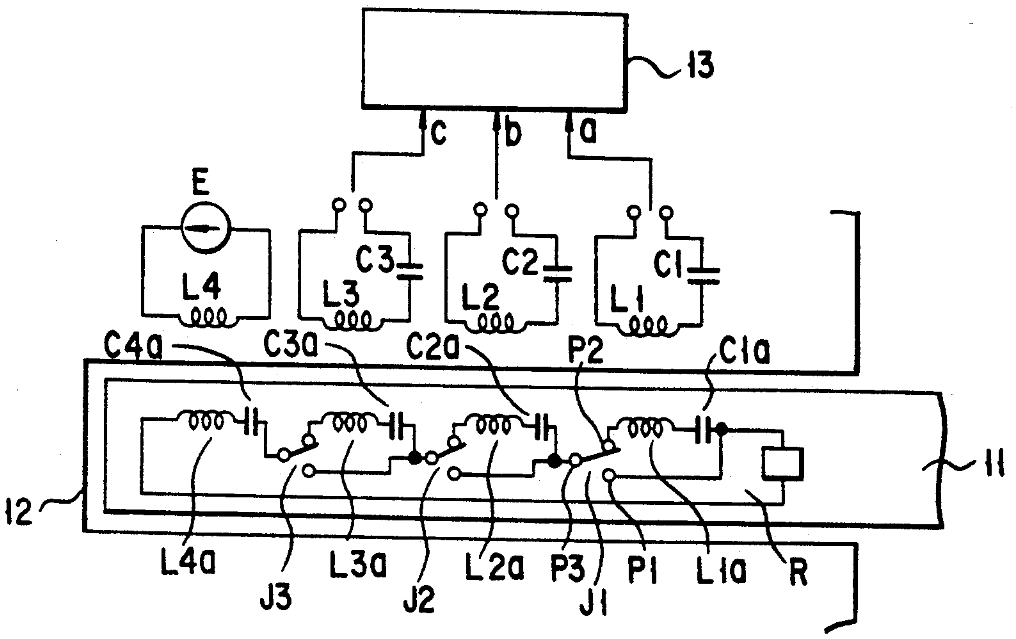
FIG. 3 is a view showing an arrangement of a main body of a key device according to an embodiment of the present invention in detail.

FIG. 3 is a view showing an arrangement of a main part of a key device according to this embodiment. Reference numeral 11 denotes a key main body, and reference numeral 12 denotes a key insertion hole in which the key main body 11 arranged on a printed board 15 is inserted. Four coils L1, L2, L3, and L4 are arranged on the printed board 15 along the longitudinal direction of the key insertion hole 12. A DC power supply E is connected to only the coil L4 located at a position opposite to the deepest part of the hole 12, and capacitors C1, C2, and C3 are connected in series with the coils L1, L2, and L3 in the insertion hole, respectively.

A key signal detection circuit 13 detects a signal a generated across the coil L1, a signal b generated across the coil L2, and a signal c generated across the coil L3. A signal detected by the key signal detection circuit 13 is loaded in a microprocessor constituting a control main body of a electric equipment.

The key main body 11 is obtained by shielding a printed board 11*a* with a shield member. On this printed board 11*a* of the key main body, a closed circuit R is formed. In this closed circuit R, when the key main body 11 is normally inserted into the key insertion hole 12 as shown in FIG. 3, a first coil L4*a* and a capacitor C4*a* are located at a position opposite to the coil L4 connected to the power supply E, and three coils L1*a*, L2*a*, and L3*a* are located at positions opposite to the coils L1, L2, and L3, respectively. The coils L1*a*, L2*a*, and L3*a* are connected in series with capacitors C1*a*, C2*a* and C3*a*, respectively.

The capacitors C1*a* to C4*a* and the coils L1*a* to L4*a* are alternately connected in series on the key main body 11. The series circuit of the coil L1*a* and the capacitor C1*a*, the series circuit of the coil L2*a* and the capacitor C2*a*, and the series circuit of the coil L3*a* and the capacitor C3*a* are connected to bypasses, respectively. Any one of the paths on the coil side and the bypass side is selected by using jumper lines switching sections J1, J2, and J3, thereby forming the closed circuit R.

Figure 4:
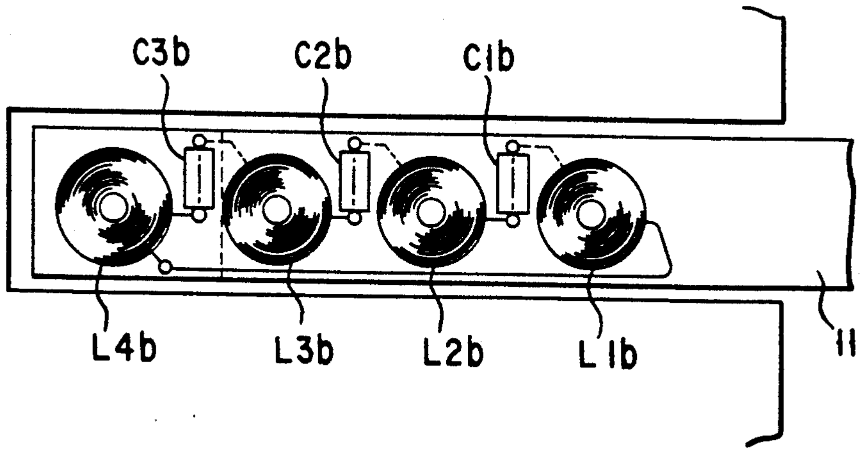
FIG. 4 is a view showing another embodiment of the present invention wherein patterned coils are arranged in place of coil windings on a key main body.
Figure 5:
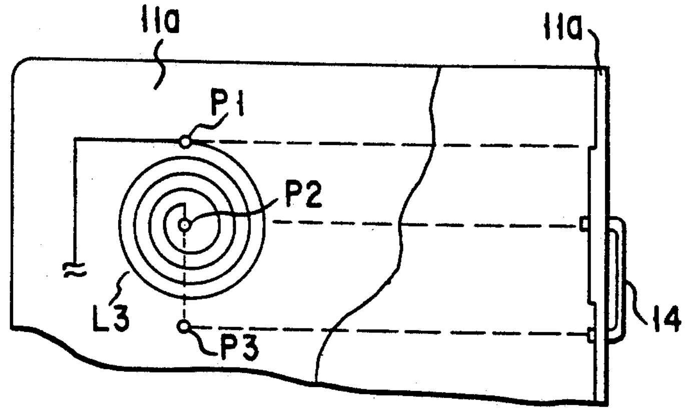
FIG. 5 is an enlarged view showing one of the coil windings arranged on the key main body in the embodiment shown in FIG. 3.

In the embodiment shown in FIG. 3, coil windings are used in the coils L1 to L4 and L1*a* to L4*a*. However, as shown in FIG. 4, coil patterns L1*b*, L2*b*, L3*b*, and L4*b* and capacitors C1*b*, C2*b*, and C3*b* may be alternately connected to each other in series on a printed board 11*a* to form a circuit. In the arrangement shown in FIG. 3, a switching operation of each of the jumper line switching sections J1 to J3 is performed as follows. As shown in FIG. 5, for example, a jumper line 14 is selectively connected to the coil-side terminal or bypass-side terminal of the coil L3 from the rear side of the printed board, thereby performing a switching operation.

That is, as shown in FIG. 5, when the jumper line 14 is connected across coil terminals P2 and P3, it is means that the coil L1*a* is selected in the closed circuit R. When the bypass-side terminal is to be selected, the jumper line 14 is connected across the terminals P1 and P3.

In the embodiment arranged as described above, when the key main body 11 is normally inserted into an insertion hole 12, the coils L1 to L4 are opposite to the coils L1*a* to L4*a* arranged on the key main body, respectively. For this reason, since a current flows into the coil L4 located at a position opposite to the deepest part of the insertion hole 12 due to the operation of the power supply E, electromagnetic induction occurs between the coil L4 and the coil L4*a* opposite to each other to generate an induced current in the closed circuit R. As a result, the current flows into the coils L1*a* to L3*a* in which the coil-side paths are selected by the jumper line switching sections J1 to J3, and electromagnetic induction occurs between the coils L1*a* to L3*a* and the coils L1 to L3 opposite to each other, thereby outputting key signals a to c from the corresponding coils L1 to L3. The key signals a to c output as described above are detected by the key signal detection circuit 13 and loaded in the microprocessor.

In the step of inserting the key main body 11, since an induced current cannot be generated in the closed circuit R, no signal is generated by the coils L1 to L3.

In FIG. 3, the coil-side paths are selected by the jumper line switching sections J1, J2, and J3 in the coils L1*a* to L3*a* arranged on the key main body 11. For this reason, when the key main body 11 is normally inserted in the insertion hole 12, the signals a to c are generated by the coils L1 to L3, and this state (all the signals a to c are set in an ON state) is detected by the key signal detection circuit 13 as a key signal.

Figure 6:
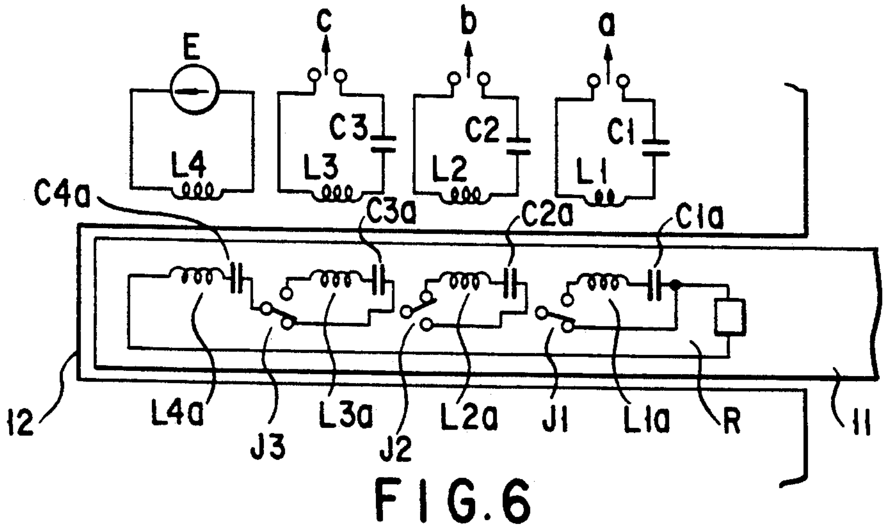
FIG. 6 is a view showing an operation of the key device in the embodiment shown in FIG. 3.

In the embodiment shown in FIG. 6, the coil-side path is selected by the jumper line switching section J2 in only the coil L2*a* on the key main body 11, and the bypass-side paths are selected by the jumper line switching sections J1 and J3 in the coils L1*a* and L3*a*. Therefore, when the key main body 11 is normally inserted into the insertion hole 12, the signal b is generated by only the coil L2 opposite to the coil L2*a*, and this state (the signal b is set in an ON state, and the signals a and c are set in an OFF state) is detected by the key signal detection circuit 13 as a key signal.

Figure 7:
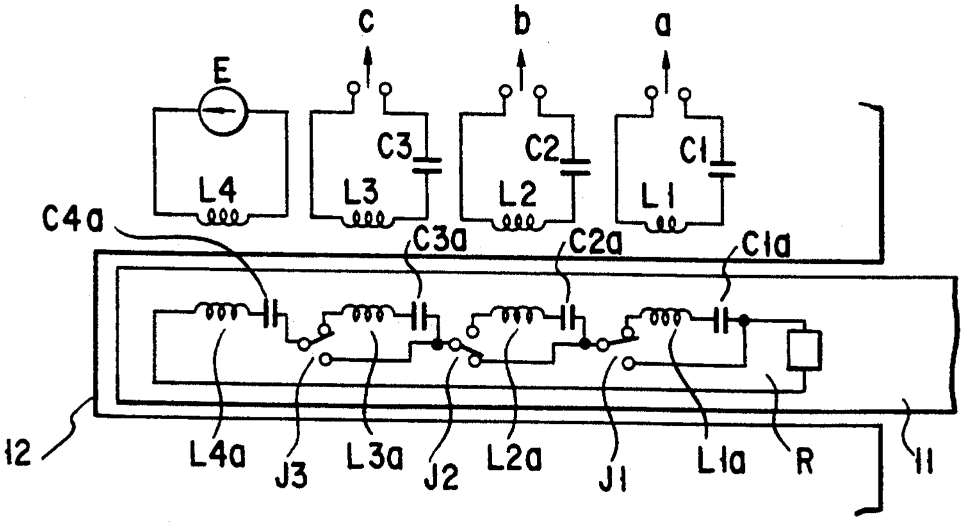
FIG. 7 is a view showing another operation of the key device in the embodiment shown in FIG. 3.

In the embodiment in FIG. 7, the bypass-side path is selected by the jumper line switching section J2 in only the coil L2*a*, and the coil-side paths are selected by the jumper line switching sections J1 and J3 in the coils L1*a* and L3*a*. Therefore, when the key main body 11 is normally inserted into the insertion hole 12, signals are generated by the coils L1 and L3 opposite to the coils L1*a* and L3*a*, respectively, and this state (the signals a and c are set in an ON state, and the signal b is set in an OFF state) by the key signal detection circuit 13 as a key signal.

As described above, according to the above embodiment, the key main body 11 is formed by the printed board 11, the four coils L1*a* to L4*a* are formed on the printed board as coil patterns, and these coil patterns are connected to each other in series through the capacitors C1*a* to C4*a* to form the closed circuit R. Bypasses are arranged for the coils L1*a* to L3*a*, a coil side-path and a bypass-side path can be selected by the jumper lines 14 in each of the coils L1*a* to L3*a*, thereby forming the key main body 11. Therefore, the key main body 11 can be easily processed compared with the conventional case wherein a plurality of magnets are buried in a plate-like key main body consisting of a magnetically permeable material. In addition, the key main body of this embodiment can be thinned.

Furthermore, since a magnet is buried in a conventional key main body, the type of the resultant key cannot be easily changed. However, in this embodiment, types of key can be variably set by only switching the jumper lines 14. For this reason, the present invention can advantageously cope with a change in key type.

In the above embodiments, the four coils are arranged on the key main body 11, and the four coils are used for generating key signals. However, the present invention is not limited to the embodiments. In addition, the power supply E is connected to a coil located at the position opposite to the deepest part of the hole 12. However, if a means for detecting that the key main body 11 is normally inserted in the insertion hole 12 is also arranged, a coil connected to the power supply is not limited to the deepest coil.

It should be understood that various changes and modifications may be effected without departing form the spirit and scope of the invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A key device comprising:

a printed board having an insertion hole;

key signal generating means including a plurality of coils arranged on said printed board along a longitudinal direction of said insertion hole, said key generating means comprising a power supply, an electromagnetic induction generating coil connected to said power supply, and at least two key signal generating coils;

a key main body comprising a printed board which can be inserter/removed into/from said insertion hole, said key main body comprising a closed circuit including a plurality of coils which are respectively arranged at positions opposite to said plurality of coils of said key signal generating means when said key main body is normally inserted into said insertion hole, and jumper lines for selecting said coils to specify a key type, said jumper lines being connected in series between said plurality of coils through a capacitor such that said jumper lines can be switched to a bypass; and detecting means, connected to said key signal generating coils of said key signal generating means, for detecting a key signal which is generated by a key signal generating coil opposite to said selected coil of said closed circuit when said key main body is normally inserted into said insertion hole.

2. A device according to claim 1, wherein said plurality of coils of said key signal generating means and said plurality of coils arranged on said key main body comprise coil windings.

3. A device according to claim 1, wherein said plurality of coils of said key signal generating means and said plurality of coils arranged on said key main body comprise coil patterns formed on said printed board.

* * * * *